United States Patent [19]

Shaver

[11] 4,029,228

[45] June 14, 1977

[54] SELF-RAISING BIN LOADING AUGER FOR COMBINES

[75] Inventor: J. Lyle Shaver, Blue Springs, Mo.

[73] Assignee: Allis-Chalmers Corporation, Milwaukee, Wis.

[22] Filed: Sept. 26, 1975

[21] Appl. No.: 617,101

[52] U.S. Cl. .............................. 214/522; 214/17 C
[51] Int. Cl.² .................................. B60P 1/40
[58] Field of Search ............... 214/522, 521, 83.36, 214/83.32, 17 C, 17 CA, 41, 15 R, 15 E; 198/36, 69, 94, 99; 296/57 A; 141/284; 53/244

[56] References Cited

UNITED STATES PATENTS

| 796,477 | 8/1905 | Wallace | 198/213 X |
| 1,754,533 | 4/1930 | Kirk | 198/213 X |
| 1,886,295 | 11/1932 | Morris | 214/17 C |
| 2,557,001 | 6/1951 | Kohl | 198/69 X |
| 3,503,533 | 3/1970 | Bichel | 214/83.32 X |
| 3,938,684 | 2/1976 | Quoiffy et al. | 214/83.32 X |

FOREIGN PATENTS OR APPLICATIONS

| 510,464 | 8/1939 | United Kingdom | 296/57 A |

*Primary Examiner*—Albert J. Makay
*Attorney, Agent, or Firm*—Robert C. Sullivan

[57] ABSTRACT

A loading apparatus for the grain tank or bin of an agricultural combine. The grain tank or bin is located in the upper part of the combine, and, in the illustrated embodiment, the grain bin comprises a main grain bin and a grain bin extension mounted above the main grain bin. Clean grain which has been separated from the straw, chaff, or the like, is conveyed by an elevating conveyor which discharges the grain into a relatively short horizontal fixed auger conveyor which is in grain feeding relation to an elongated pivotally mounted "floating" auger conveyor. The pivotally mounted floating auger conveyor extends from contiguous the laterally inner end of the horizontal auger conveyor and in overlying relation to the hollow interior of the bin and discharges into the bin at a substantially central location. The rotatable shaft of the horizontal auger conveyor is connected in driving relation to the rotatable shaft of the pivoted or floating auger conveyor by a universal drive joint. As the grain level in the grain bin approaches a full condition, the floating auger conveyor moves angularly upwardly from a horizontal position due to the reaction of the discharging grain with the upper surface of the already loaded grain, at least the discharge end of the floating auger conveyor riding on the upper surface of the already loaded grain.

2 Claims, 5 Drawing Figures

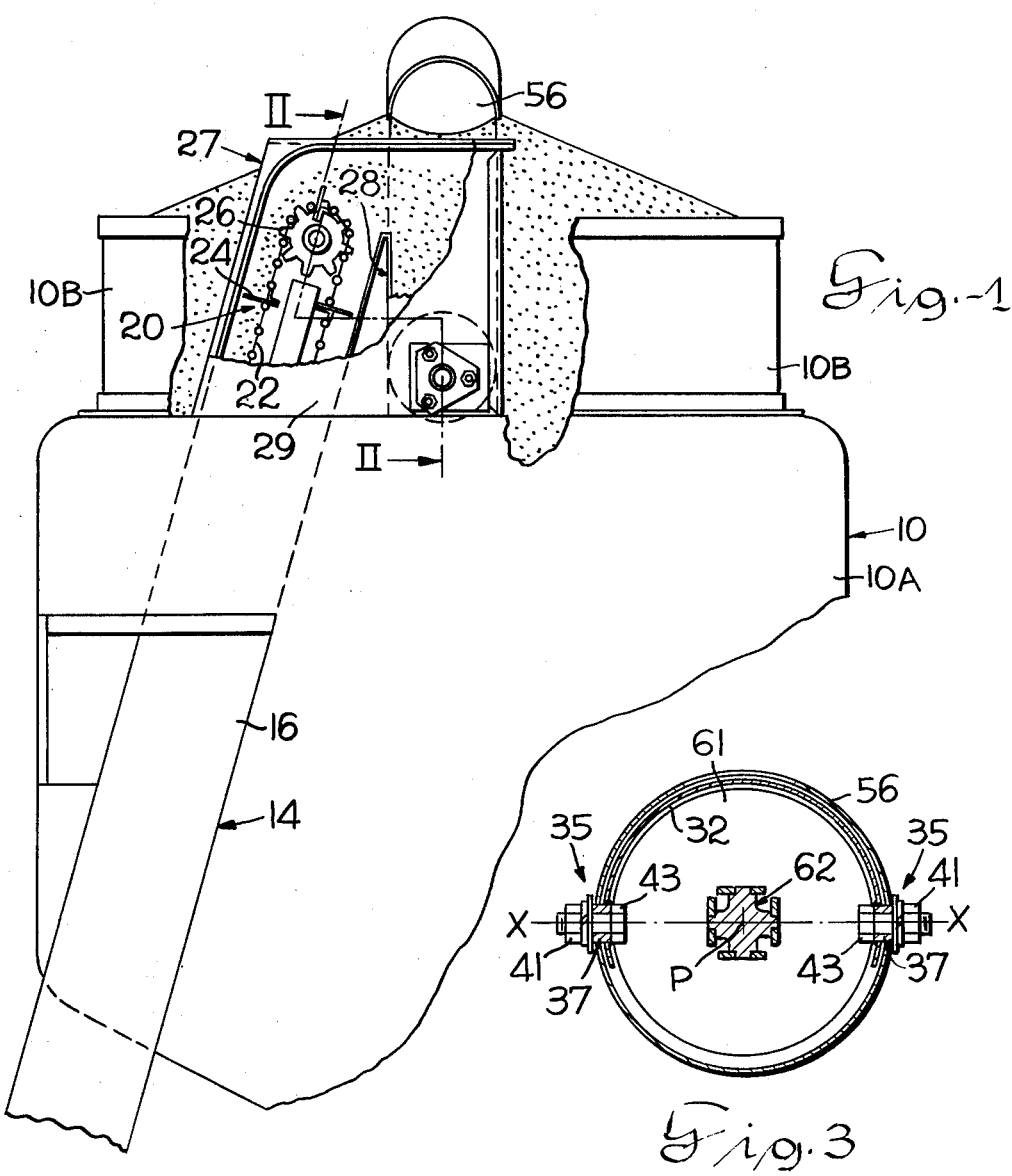
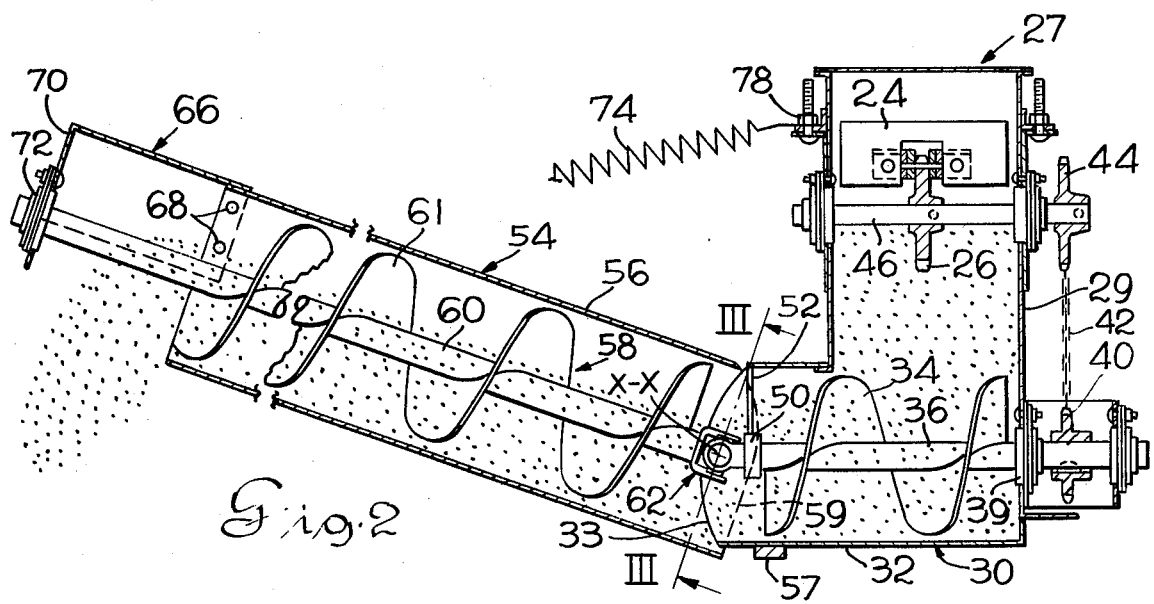

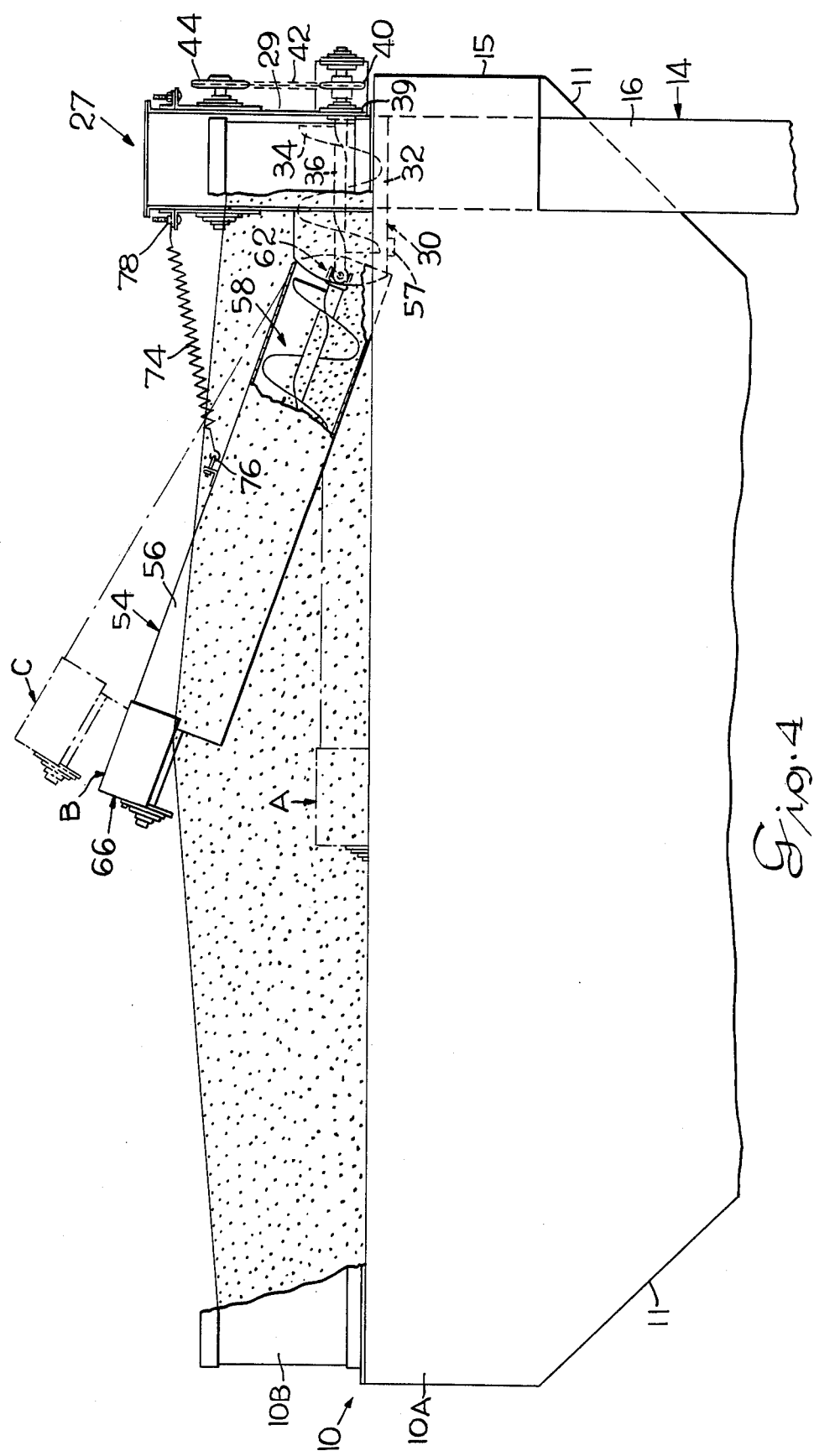

SELF-RAISING BIN LOADING AUGER FOR COMBINES

BACKGROUND OF THE INVENTION

1. Field of the Invention

This invention relates to a loading apparatus for the grain tank of an agricultural combine, and to the combination of such a loading apparatus with the grain tank of an agricultural combine.

2. Description of the Prior Art

Argicultural combines used in the harvesting of grain crops conventionally include an elevated grain tank or bin in which the harvested crop is temporarily stored during the harvesting operation for discharge at appropriate intervals into attendant vehicles or receptacles. Combines having grain storage tanks or bins and conveyor arrangements for loading such grain storage tanks are shown, for example, by U.S. Pat. Nos. 3,152,702, issued to Herman G. Klemm et al on Oct. 13, 1964; 3,193,118, issued to Ralph L. Tweedale on July 6, 1965; and 3,503,533 issued to D. C. Bichel on Mar. 31, 1970.

The grain storage tank or bin on the combine is conventionally loaded by a clean grain elevator which collects the clean grain from the grain cleaning mechanism and elevates it to adjacent the top of the grain tank where the clean grain elevator delivers the clean grain to an additional conveyor means, usually of the auger type, which overlies the open upper end of the grain tank, the auger conveyor means discharging the grain at some intermediate point overlying the grain tank whereby to obtain substantially even loading and distribution of the grain into the grain storage tank. Such an arrangement is shown, for example, by the aforementioned U.S. Pat. No. 3,503,533.

In the prior art arrangements of which I am aware, including that shown by the aforementioned U.S. Pat. No. 3,503,533, the auger conveyor which receives the grain from the clean grain elevator contiguous the upper portion of the grain storage tank on the combine has a fixed position relative to the grain tank and extends either in a horizontal direction or at an angle inclined upwardly from the horizontal as in U.S. Pat. No. 3,503,533.

STATEMENT OF THE INVENTION

Accordingly, it is an object of the present invention to provide in conjunction with a grain storage tank or bin of an agricultural combine a grain distributing auger conveyor which receives clean grain from a clean grain elevator, at least the discharge end of and which is characterized by the fact that at least the discharge end of the bin loading auger conveyor floats or rides upon the upper surface of the piled-up grain within the storage tank or bin after the level of the grain reaches a predetermined level within the bin (approaching a full condition of the bin), the bin loading auger conveyor at least the discharge end of rising upwarding about a pivotal axis as the level of the grain in the grain bin approaches a fully loaded position. This is in contrast to bin loading augers of the prior art in which the auger remains at all times in a fixed position relative to the ascending level of the grain being loaded in the grain storage tank.

It is a further object of the invention to provide for use in conjunction with the grain storage tank or bin of an agricultural combine a bin loading auger conveyor which floats upon the upper surface of the grain level as the grain storage bin approaches a full condition whereby to reduce grain damage and whereby to reduce power requirements for driving the bin loading auger, as compared to a situation in which a fixed position bin loading auger conveyor might have its discharge end become submerged beneath the grain level in the storage bin or tank with consequent grain damage and high power consumption.

It is a further object of the invention to provide in combination with a grain storage bin of an agricultural combine a bin loading auger conveyor in which the auger conveyor rides upon the surface of the grain as the bin approaches a full condition, rather than being fixedly and permanently mounted above the highest level of the grain in the bin, (another possible undesirable alternative), whereby applicant's construction avoids excessive height of the combine.

In achievement of these objectives there is provided in accordance with an embodiment of the invention a loading apparatus for the grain tank or bin of an agricultural combine. The grain tank is located in the upper part of the combine, and in the illustrated embodiment the grain bin comprises a main grain bin and a grain bin extension mounted above the main grain bin. Clean grain which has been separated from the straw, chaff, or the like, is conveyed by an elevating conveyor which discharges the grain into a relatively short horizontal fixed auger conveyor which is in grain feeding relation to an elongated pivotally mounted "floating " auger conveyor. The fixed horizontal auger conveyor is positioned contiguous the upper portion of the bin, but spaced below the upper end of the bin extension, and also extends laterally inwardly to the bin from the general region of one longitudinal side of the bin. A pivotally mounted floating auger conveyor extends from contiguous the laterally inner end of the horizontal auger conveyor and in overlying relation to the hollow interior of the bin and discharges into the bin at a substantially central location. The rotatable shaft of the horizontal auger conveyor is connected in driving relation to the rotatable shaft of the pivoted or floating auger conveyor by a universal drive joint, whereby the auger shaft of the pivotally mounted floating auger conveyor is rotatably driven at any angular position in a vertical plane which the auger tube of the floating auger conveyor may be required to assume about its horizontal pivotal axis. As the grain level in the grain bin approaches a full condition, the floating auger conveyor moves angularly upwardly from a horizontal position due to the reaction of the discharging grain with the upper surface of the already loaded grain, the floating auger conveyor riding on the upper surface of the already loaded grain. A tension spring may be used to exert an upward force on the floating auger conveyor, supplementing the aforementioned reaction force of the discharging grain. The use of a floating discharge auger conveyor which rides on the upper surface of the already loaded grain as the grain bin approaches a full condition minimizes grain damage and lowers power requirements as compared to a discharge auger conveyor the discharge end of which might become submerged in the already loaded grain, and also avoids excess height of the combine as compared to a fixed position discharge auger conveyor which is permanently located at the maximum height required, whereas the "floating " discharge auger conveyor only reaches its maximum height when the grain level in the bin reaches its maximum height.

BRIEF DESCRIPTION OF THE DRAWINGS

Further objects and advantages of the invention will become apparent from the following description taken in conjunction with the accompanying drawings, in which:

FIG. 1 is a view in side elevation, partially schematic, of a grain bin mounted on an agricultural combine, and showing a clean grain elevator which delivers clean grain to the input end of the grain distributing auger conveyor arrangement in accordance with the invention;

FIG. 2 is a view taken substantially along the section line II—II of FIG. 1;

FIG. 3 is a view in transverse section along line III—III of FIG. 2 showing the pivotal support arrangement for the floating auger tube;

FIG. 4 is a partial end view with parts broken away showing the grain storage bin and associated floating grain distributing auger conveyor of FIGS. 1 and 2, the view being taken in a direction transversely of the longitudinal axis of the combine.

DESCRIPTION OF THE PREFERRED EMBODIMENT

Figure 5:
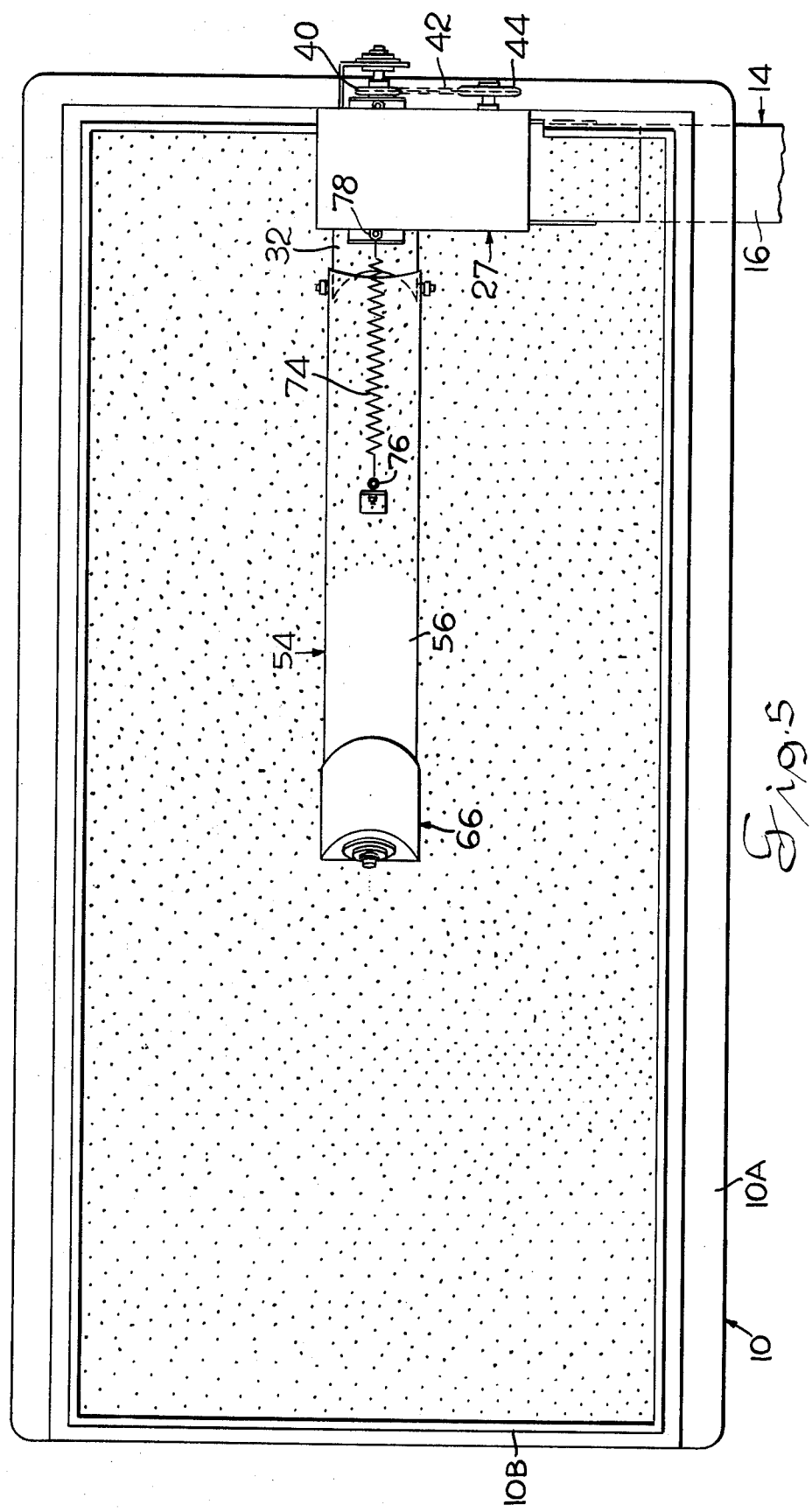
FIG. 5 is a top plan view of the apparatus of FIGS. 1 and 4.

Referring now to drawings, there is shown a grain tank or bin generally indicated at 10 which is adapted to be mounted in any suitable manner on the upper portion of an agricultural combine. In the illustrated embodiment, grain bin 10 comprises a main grain bin 10A and a grain bin extension 10B mounted above the main grain bin. The grain bin 10 is a large hollow storage tank and is normally provided with suitable means (not shown) contiguous the lower end thereof for discharging grain stored therein at appropriate intervals into attendant vehicles or receptacles.

Opposite lateral sides of the lower portion of main grain bin 10A are inclined laterally inwardly and downwardly as indicated at 11 (FIG. 4). The right-hand side of main grain bin 10A, as viewed in FIG. 4, is provided with a hollow overhang indicated at 15.

The combine on which grain bin 10 is mounted is provided with an appropriate grain separating mechanism, not shown, which separates the grain from the straw, chaff, or the like. The cleaned grain is deposited at a collecting station contiguous the lower portion of the combine structure, from whence the grain is delivered by an auger type conveyor, or the like, (not shown) to the lower end of a clean grain elevator generally indicated at 14. The clean grain elevator 14 comprises a closed housing 16, normally of rectangular cross-section, within which the conveyor flights of the grain elevator move, housing 16 extending upwardly at an inclination as viewed from one lateral (i.e., longitudinally extending) side of the conveyor. Clean grain elevator housing 16 passes upwardly at an inclination through grain bin overhang 15 and into a housing generally indicated at 27 (FIGS. 1 and 5) which projects into the grain bin extension 10B. Both housing 27 and grain bin extension 10B are suitably mounted on the upper end of main grain bin 10A. Grain bin extension 10B is slightly shorter in both longitudinal and transverse dimensions than main grain bin 10A. The upper and lower ends of grain bin extension 10B are open and the upper end of main grain bin 10A is open. Hence, when main grain bin 10A becomes full, the grain level then begins extending upwardly into grain bin extension 10B.

The function of housing 27 is to suitably enclose the upper end of clean grain elevator 14 and its housing 16, as well as to enclose grain chute 28 which delivers grain discharged by clean grain elevator 14 to horizontal auger conveyor 30, as will be explained in more detail hereinafter.

The clean grain elevator 14 includes a suitable chain 22 having conveyor flights 24 mounted thereon, flights 24 supporting the grain being elevated by clean grain elevator 14. A drive sprocket (not shown) which is driven by a suitable driving mechanism drivingly engages the lower end of chain 22. The upper end of chain 22 passes around an idler sprocket 26 which is suitably mounted on idler shaft 46 at the opposite or upper end of grain elevator 14, whereby conveyor chain 22 carrying flights 24 may elevate the clean grain picked up at the lower end of the grain elevator 14 and carry it to the upper end of the grain elevator 14 at which point the clean grain is discharged through a suitable opening in housing 16 of the clean grain elevator into a vertical chute generally indicated at 28 which delivers the clean grain thus discharged from grain elevator 14 into the upwardly open hollow interior of a short section of a fixed auger conveyor generally indicated at 30.

Fixed auger conveyor 30 includes a relatively short horizontally mounted cylindrical auger tube 32 which houses a short section of a helical auger 34 which is fixed to and rotates with a horizontal shaft 36. The under surface of fixed auger tube 32 of auger conveyor 30 is located at a height substantially contiguous the level of the junction between main grain bin 10A and grain bin extension 10B and is substantially centrally located relative to the front to rear or longitudinal dimension of main grain bin 10A (i.e., centrally of the left-to-right dimension of FIG. 1). Fixed auger tube 32 extends laterally inwardly from the right-hand lateral side wall 29 (as viewed in FIGS. 2 and 4) of housing 27 and projects for a short distance beyond the laterally inner boundary of chute 28 into the hollow interior of the hollow space defined by main grain bin 10A and grain bin extension 10B.

The horizontal rotatable shaft 36 of fixed auger conveyor 30 projects laterally through and beyond lateral side wall 29 of housing 27 and is provided with a drive sprocket 40 thereon driven through a chain 42 trained around a sprocket 44 mounted to idler shaft 46 on which idler sprocket 26 of clean grain elevator 14 is fixed. Thus, the horizontal auger shaft 36 is driven by idler shaft 46 through sprocket 44, chain 42, and sprocket 40 fixed to the outer end of auger shaft 36.

Shaft 36 of fixed auger conveyor 30 is supported by a suitable bearing 39 where shaft 36 passes through wall 29. Wall 29 of housing 27 defines an end closure for the outboard end (or right-hand end relative to FIG. 2) of fixed horizontal auger tube 32.

The inboard end of rotatable auger shaft 36 is supported by a suitable bearing 50 which is itself supported from an inner periphery of fixed horizontal auger tube 32 by a suitable support member 52 which is of such size and contour as to be in substantially nonobstructing relation to the flow of grain through horizontal auger tube 32.

In accordance with an important feature of the construction, a pivotally movable or floating auger tube subassembly, generally indicated at 54, is provided and comprises an elongated cylindrical auger tube 56 which houses a rotatable grain feed auger generally indicated at 58. Grain feed auger 58 comprises a rotatable shaft 60 and a helical auger conveyor 61 which is fixed to auger shaft 60 and rotates therewith. The outer diameter of pivotally mounted auger tube 56 is slightly larger than the outer diameter of fixed horizontal auger tube 32, permitting the end of pivotally movable auger tube 56 to telescopically overlie the contiguous laterally inner end of fixed horizontal auger tube 32 when the floating auger tube 56 is in the horizontal position indicated at A in FIG. 4.

To prevent floating auger tube 56 from dropping below the horizontal position indicated at A in FIG. 4 when the level of the grain in grain bin 10 is low, a fixed stop member 57 is suitably positioned in the path of movement of the right-hand end (relative to FIGS. 2 and 4) of floating auger tube 56, the end of auger tube 56 abutting against stop member 57 to prevent pivotal movement of auger tube 56 to a position below the horizontal position A of FIG. 4.

The rotatable auger shaft 36 within the relatively short fixed horizontal auger tube 32 projects beyond the bearing 50 which supports shaft 36 for rotation, the end of the rotatable auger shaft 36 being connected by a universal connecting means, such as a universal drive joint, generally indicated at 62, (FIGS. 2 and 4) to rotatable shaft 60 of floating auger tube subassembly 54, whereby rotation of horizontal auger shaft 36 is imparted to shaft 60 of floating auger tube subassembly 54 in any of the various angular positions in a vertical plane which floating auger tube subassembly 54 may be required to assume about a horizontal pivotal axis.

As best seen in FIG. 3, the generally cylindrical-shaped floating auger tube 56 is suitably supported for pivotal movement on contiguous stationary structure (more specifically the contiguous end of stationary horizontal auger tube 32) in such manner that floating auger tube 56 may pivotally move in a vertical plane about a horizontal pivotal axis X—X (FIG. 3) which coincides with the center or pivot point P (FIGS. 2 and 3) of universal joint 62. Thus auger tube 56 and, hence, helical auger conveyor 58 mounted therein, may move in a vertical plane from a horizontal position, such as that indicated at A (FIG. 4), to angularly inclined positions such as B and C (FIG. 4).

To facilitate the pivotal connection and freedom of pivotal movement of floating auger tube 56 relative to stationary horizontal auger tube 32, floating auger tube 56 has the end surface thereof tapered as indicated by the dotted line 59 in FIG. 2, and stationary auger tube 32 has the contiguous end surface thereof tapered as indicated by the full line 33. The tapered end surfaces 59 and 33 define tapered end portions on the respective floating and stationary auger tubes 56 and 32 through which the diametrically opposite pivot means, indicated at 35 in FIG. 3, extend to pivotally connect the contiguous ends of the respective auger tubes 56 and 32. In the illustrated embodiment shown in FIG. 3, each pivot means 35 includes a short pintle-like hollow bushing 37 which is welded or otherwise suitably secured to end portion 33 of fixed auger tube 32 and which serves as a bearing for the pivotal movement of floating auger tube 56. Each pivot means 35 also includes a bolt 43 received by hollow bushing 37 and a nut 41 threaded onto the end of bolt 43 to maintain the pivotal connection 35 in assembled relation.

A discharge end portion generally indicated at 66 is suitably connected as by rivets 68, or the like, to the laterally innermost or left-hand end relative to the views of FIGS. 2 and 4, of floating auger tube 56, end portion 66 being provided at its left-hand end relative to the views of FIGS. 2 and 4 with a radially inwardly extending wall portion 70 which supports a bearing 72 in which the inboard (or left-hand relative to FIGS. 2 and 4) end of rotatable auger shaft 60 is journalled for rotation. End portion 66 of auger tube 56 is provided with a large opening 67 therein at the under portion thereof through which grain which has been propelled through horizontally fixed auger tube 30 and through pivotally mounted floating auger tube 56 drops into main grain bin 10A or into grain bin extension 10B, depending upon the level of the grain in the bin.

A portion of the weight of floating auger conveyor 54 may be balanced by a tension spring 74 (FIG. 4) which is connected at one end thereof to the upper outer surface of auger tube 56 at a point 76 intermediate the length of floating auger tube 56, and with the opposite end of spring 74 being connected at a stationary point 78 contiguous the upper end of housing 27. Spring 74, if used, is so selected that the force of spring 74 alone is not sufficient to raise the "floating" auger conveyor 54 to an upwardly pivoted position such as that shown in B or C in FIG. 4. However, the force of spring 74 when supplemented by the reaction force of the grain being discharged by the discharge end 66 of floating auger tube 56 against the upper surface of the grain which has accumulated in grain bin 10 will together be sufficient to raise the floating auger tube 56 about its pivotal support axis X—X (FIG. 3) to an elevated position such as one of the positions B or C (FIG. 4).

Operation of the Grain Bin Loading Apparatus

During the grain bin loading operation, as long as the level of the grain in grain bin 10 is lower than the under surface of floating auger tube 56 in the horizontal "A" position of auger tube 56 (FIG. 4), auger tube 56 will remain in the horizontal position and will discharge grain into bin 10 while in the horizontal or "A" position.

Clean grain is received by the lower end of the clean grain elevator generally indicated at 14 and is elevated by endless conveyor 20 to the upper end thereof where the clean grain is discharged into the vertical chute 28 which delivers the clean grain through the open upper end of the fixed horizontal auger tube 32 into the interior of auger tube 32. Auger shaft 36 in fixed horizontal auger tube 32 is rotatably driven from sprocket 44 on idler shaft 46 at the upper end of the clean grain elevator 14, through chain 42 and sprocket 40 on the laterally outer end of auger shaft 36. Auger shaft 36 carries helical grain conveyor auger 34 which rotates in horizontal auger tube 32 to propel the grain through horizontal auger tube 32. The left-hand end of auger shaft 36 relative to the views of FIGS. 2 and 4 is connected by universal drive joint 62 to rotatable auger shaft 60 in floating auger tube 56. Floating auger tube 56 is pivotally mounted relative to fixed horizontal auger tube 32 for pivotal movement about a pivotal axis X—X which passes through the pivot point or center P (FIGS. 2 and 3) of universal drive joint 62, whereby floating auger shaft 60 and floating auger tube 56 which houses shaft 60 pivot in a vertical plane about the horizontal pivotal axis X—X. Rotation of horizontal auger shaft 36 imparts rotation through universal drive joint 62 to auger shaft 60 in floating auger tube 56, whereby to rotatably drive helical grain conveyor auger 61 which is fixed to and rotatable with rotatable auger shaft 60 of the floating auger conveyor. auger tube 56 which houses shaft 60 pivot in a vertical plane about the horizontal pivotal axis X—X. Rotation of horizontal auger shaft 36 imparts rotation through universal drive joint 62 to auger shaft 60 in floating auger tube 56, whereby to rotatably drive helical grain conveyor auger 61 which is fixed to and rotatable with rotatable auger shaft 60 of the floating auger conveyor.

The grain which has been propelled through horizontal stationary auger tube 32 by rotating helical auger conveyor 34 thence passes into floating auger tube 56 in which it is propelled toward discharge end 66 by rotating helical auger conveyor 61. In any of the various pivoted positions to which floating auger tube 56 may move with the rising level of the grain (such as positions B and C, FIG. 4), there is always sufficient overlap between the contiguous ends of stationary auger tube 32 and of pivoted or floating auger tube 56 to insure proper delivery of grain from fixed auger tube 32 to pivoted or floating auger tube 56.

When the level of grain in main grain bin 10A reaches a predetermined level, wherein the grain level in the bin rises substantially to the level of discharge opening 67 of discharge end 66, such as a level substantially that of the under surface of floating auger tube 56 in its horizontal or "A" position (FIG. 4), the reaction force of the grain being discharged through discharge end 66 of auger tube 56 against the upper surface of the accumulated grain in main grain bin 10A will impart an upward thrust force to pivotally mounted auger tube 56, tending to cause floating auger tube 56 to swing upwardly about its pivotal connection about horizontal axis X—X. As the grain continues to pile up above the level of the upper edge of main grain bin 10A and extends into grain bin extension 10B mounted above and in grain flow communication with main grain bin 10A, floating auger tube 56 will pivotally move about its pivotal support to assume positions such as those indicated at B and C in FIG. 4.

As the level of the grain exceeds the level of the under surface of floating auger tube 56 in its horizontal of "A" (FIG. 4) position, the under surface of at least the discharge end of the floating auger tube 56 will always rest substantially on the upper surface in the accumulated grain in main grain bin 10A or grain bin extension 10B, as the case may be, and the floating auger tube 56 will continue to swing upwardly above its pivotal axis X—X as the level of the grain continues to rise in grain bin extension 10B to the heaped condition shown in FIG. 4 wherein the free end of the tube 56 is disposed above the height of the bin and elevator housing 27. This upward movement of floating auger tube 56 as previously mentioned is due, in the illustrated embodiment, to the combined action of (1) the reaction force of the grain being discharged by the discharge end 66 of floating auger tube 56 against the upper surface of the accumulated grain in the grain bin; and (2) the tension force of spring 74 which of itself is not enough to move the pivotally mounted auger tube 56 upwardly about its pivotal support but which when combined with the reaction force of the discharging grain against the upper surface of the already loaded grain effectuates the upward pivotal movement of floating auger tube 56. In some constructions and/or under certain operating conditions, the use of tension spring 74 may not be required to effectuate the upward pivotal movement of floating auger tube 56.

When the grain bin is emptied, the pivotally mounted floating auger tube 56 will pivotally move in a downward direction until it again reaches the horizontal limiting position indicated at "A" in FIG. 4.

While the driving connection between horizonal rotatable shaft 36 and the floating rotatable shaft 60 has been illustrated and described as being a universal joint, other types of flexible joints could be used for effecting a driving connection between shaft 36 and shaft 60.

It can be seen that the floating bin loading auger conveyor of the invention has various advantages over the prior art. One advantage is that the floating auger discharge is always on the upper surface of the accumulated grain in the bin when the bin is approaching a fully loaded position thereby avoiding possible grain damage and high power consumption which would occur if the discharge auger were in a fixed position in which the discharge end might become submerged in the grain rather than above the grain as in the case of the present invention. Furthermore, since the floating auger conveyor 54 floats on the upper surface of the already loaded grain when the bin is approaching full condition, the discharge auger is not fixedly positioned at an elevated location relative to the grain bin as in the case, for example, of the structure shown by the aforementioned U.S. Pat. No. 3,503,533 in which the discharge auger is always maintained in a fixed position at its maximum height, resulting in a constant possible excess height of the bin loading apparatus, in contrast to the structure of the present invention in accordance with which the floating auger is only at its maximum elevated position (such as position C in FIG. 4 of the drawings, for example) when the grain level in the grain bin is actually at its maximum level.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a grain storage tank means adapted to be mounted on an agricultural combine, an elevating conveyor adapted to deliver grain to an upper portion of said storage tank means, a grain conveyor positioned contiguous but beneath the upper end of said storage tank means, said grain conveyor comprising an auger tube and an auger conveyor mounted for rotation in said auger tube, said auger tube being adapted to receive grain discharged by said elevating conveyor and to convey grain thus received to a substantially downwardly directed discharge outlet of said auger tube in overlying relation to the interior of said storage tank means, a drive means for said auger conveyor, said auger conveyor being rotatably drivingly connected to said drive means through a universal connecting means whereby said auger conveyor remains connected in driven relation to said drive means at changing angular positions of said auger tube relative to the horizontal plane, and support means supporting said auger tube for pivotal movement about a horizontal axis coincident with the center of said universal connecting means, the reaction force of the grain being discharged from said substantially downwardly directed discharge outlet of said auger tube against the upper surface of the already loaded grain in said storage tank means urging said auger tube to swing upwardly about its horizontal pivotal axis and thus to cause at least the discharge end of said auger tube to always float on the upper surface of the already loaded grain in said storage tank means when the level of grain in said storage tank means exceeds a predetermined level.

2. The combination defined in claim 1 which additionally comprises a spring means which supplements said reaction force to assist at least the discharge end of said auger tube to ride on said upper surface of the already loaded grain.

\* \* \* \* \*